United States Patent [19]
Haimi-Cohen

[11] Patent Number: 5,983,093
[45] Date of Patent: Nov. 9, 1999

[54] WIRELESS TERMINAL AND WIRELESS TELECOMMUNICATIONS SYSTEM ADAPTED TO PREVENT THE THEFT OF WIRELESS SERVICE

[75] Inventor: Raziel Haimi-Cohen, Springfield, N.J.

[73] Assignee: Lucent Technologies, Inc., Murray Hill, N.J.

[21] Appl. No.: 08/906,817

[22] Filed: Aug. 6, 1997

[51] Int. Cl.⁶ .................................................. H04Q 7/20
[52] U.S. Cl. ........................................ 455/411; 455/410
[58] Field of Search .................................. 455/410, 411, 455/414, 418, 564, 403; 379/355, 356

[56] References Cited

U.S. PATENT DOCUMENTS

| | | | |
|---|---|---|---|
| 5,239,294 | 8/1993 | Flanders et al. | 340/825.34 |
| 5,457,737 | 10/1995 | Wen | 455/33.1 |
| 5,907,804 | 5/1999 | Schroderus et al. | 455/411 |

*Primary Examiner*—Nguyen Vo
*Assistant Examiner*—Edan Orgad

[57] ABSTRACT

A wireless terminal and wireless telecommunications system are disclosed that prevent a thief of a wireless terminal from using the stolen wireless terminal to steal wireless service. A PIN is stored in the wireless terminal and the wireless terminal itself checks that a candidate PIN matches the stored PIN before the wireless terminal will initiate a call or will establish an incoming call. Thereafter, however, the user is permitted to call that telephone number or to receive a call from that telephone number without having to enter a candidate PIN again.

In the wireless telecommunications system, a PIN is stored in a subscriber database for each user. The subscriber database also contains a history list of the telephone numbers that each user has previously called or received calls from. When the user first attempts to call a telephone number from which a received call has not been established, the wireless telecommunications system requires the user to enter a candidate PIN that matches the stored PIN before the call is established. Thereafter, the user is permitted to call that telephone number or receive a call from that telephone number without having to enter a candidate PIN again. Alternatively, when the user first receives a call from a telephone number that the user has not previously called, the wireless telecommunications system requires the user to enter a candidate PIN that matches the stored PIN before the call is established. Thereafter, the user is permitted to call that telephone number or receive a call from that telephone number without having to enter a candidate PIN again.

42 Claims, 6 Drawing Sheets

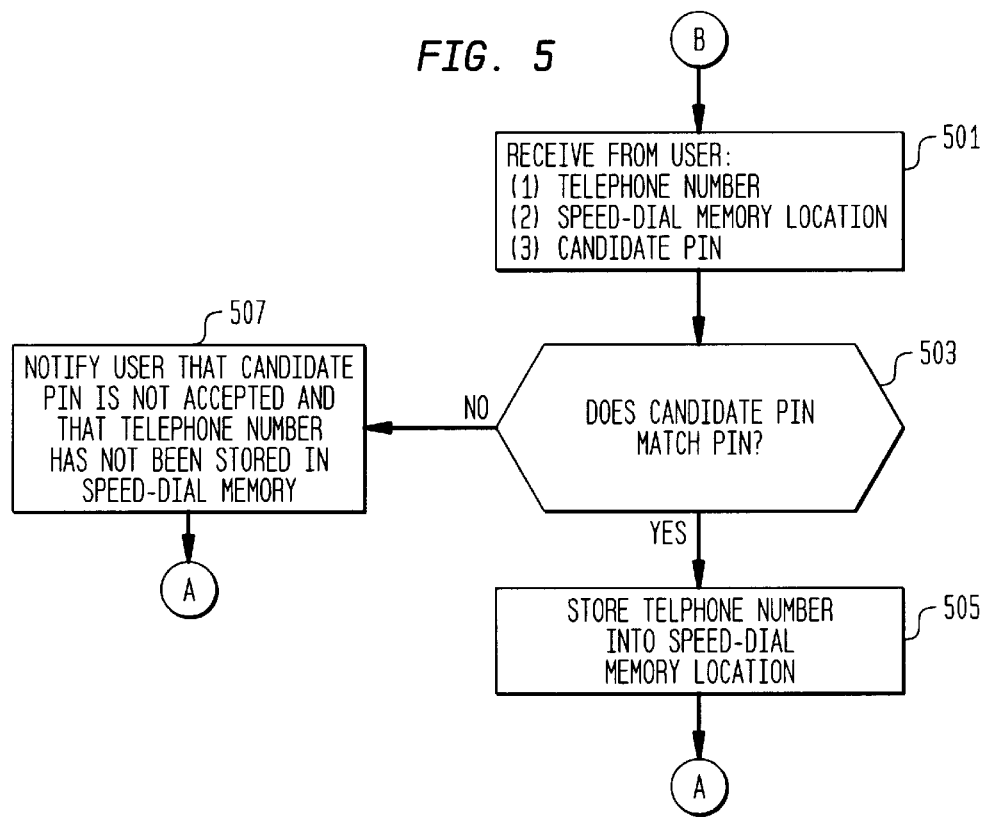
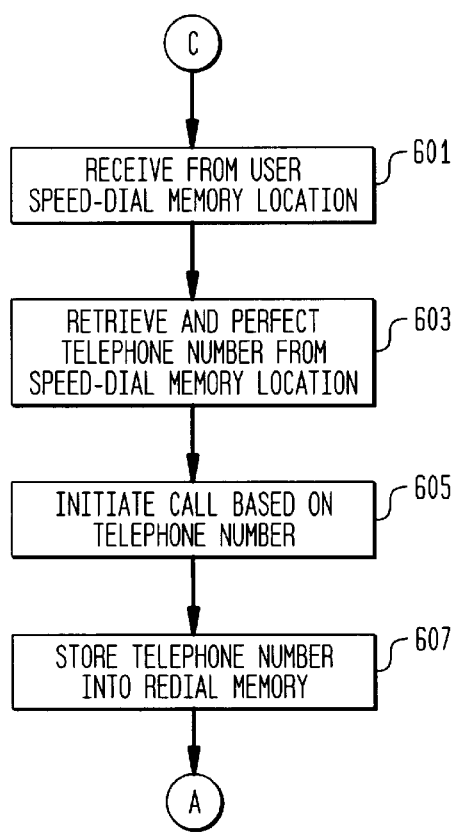
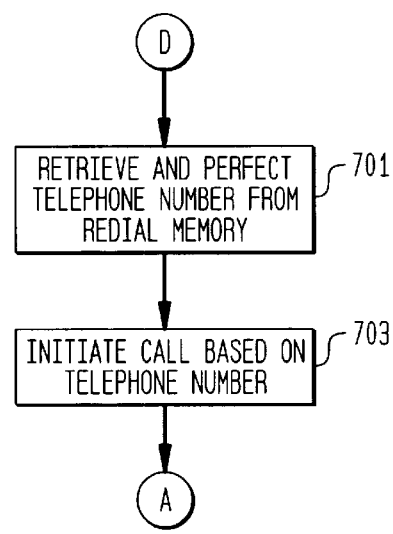
FIG. 5
FIG. 6
FIG. 7

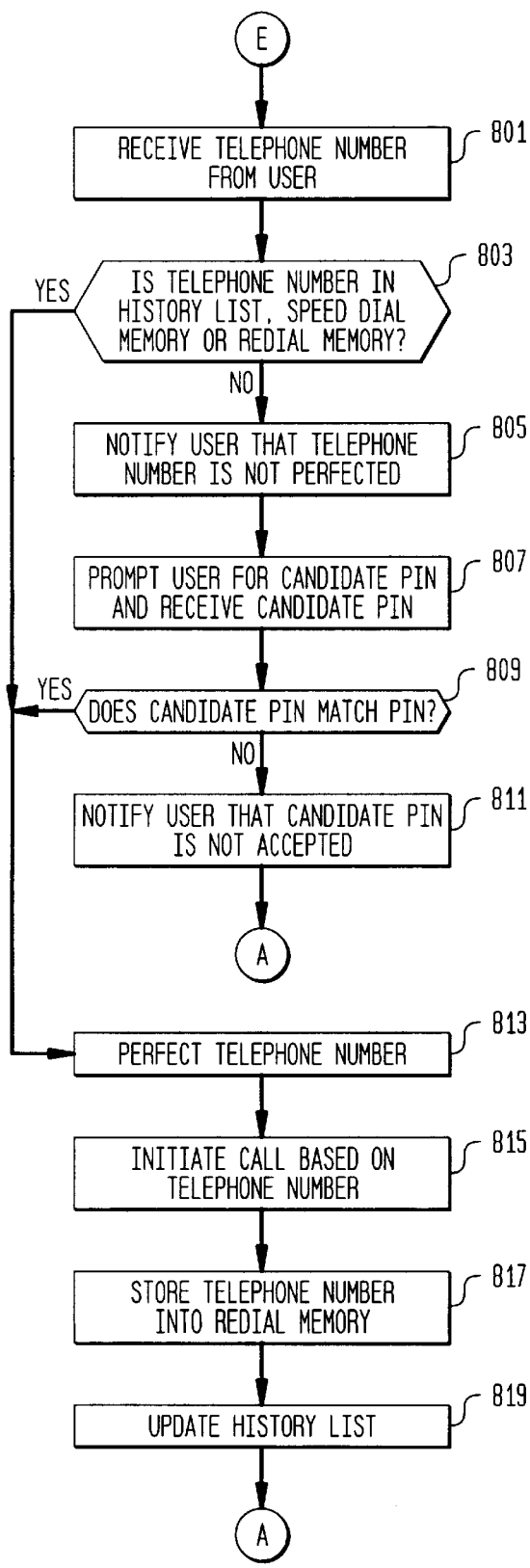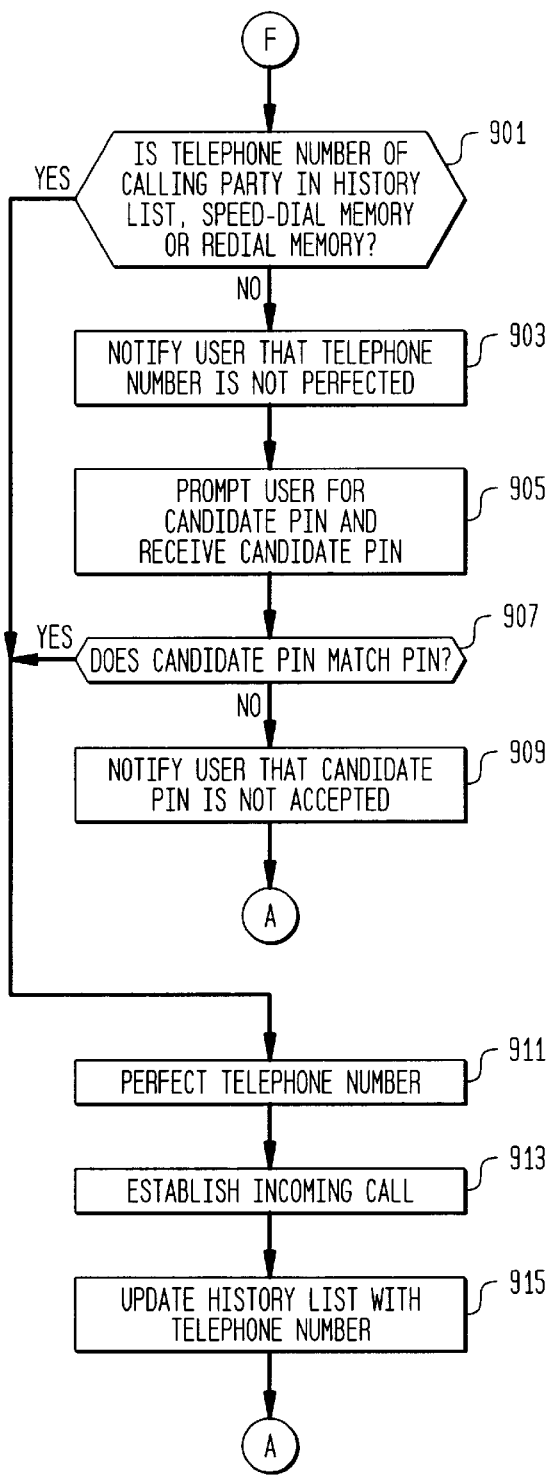

WIRELESS TERMINAL AND WIRELESS TELECOMMUNICATIONS SYSTEM ADAPTED TO PREVENT THE THEFT OF WIRELESS SERVICE

FIELD OF THE INVENTION

The present invention relates to wireless telecommunications in general, and, more particularly, to a method and apparatus for preventing the use of a lost or stolen wireless terminal to steal wireless service.

BACKGROUND OF THE INVENTION

The theft of wireless telecommunications service is a major problem for a wireless service provider. Traditionally, a thief steals wireless service by "cloning" a legitimate user's wireless terminal and by using the clone to a place call, which is then billed to the legitimate user. Typically, a thief clones a wireless terminal by using a sophisticated radio to eavesdrop on a legitimate wireless call and to obtain the legitimate user's wireless terminal's authentication codes. When the thief has obtained the authentication codes, the thief re-programs another wireless terminal with the authentication codes, which results in a clone.

To combat the ease with which authentication codes can be stolen through eavesdropping, authentication codes are now typically encrypted when they are transmitted to and from the wireless terminal. Although this precaution usually precludes the theft of wireless service through eavesdropping, it does not, however, eliminate all theft of wireless service.

Because a wireless terminal is small and portable, a thief can easily steal a legitimate wireless terminal and use the wireless terminal to steal wireless service. To prevent a thief from using a stolen wireless terminal to steal wireless service, a wireless telecommunications system can incorporate a password-based system that must be satisfied before an outgoing call can be initiated or an incoming call can be answered.

In accordance with the password-based system, the wireless service provider and each authorized user agree on a personal identification number ("PIN"), which is stored in the wireless telecommunications system's subscriber database as part of the user's record. Thereafter, when the user initiates a call from the wireless terminal, the wireless telecommunications system makes an authentication request. The authentication request prompts the user to enter a candidate PIN into his or her wireless terminal and to transmit the candidate PIN to the wireless telecommunications system. If, and only if, the candidate PIN matches the PIN in the database does the wireless telecommunications system complete the call. Presumably, the thief of a wireless terminal would not know the user's PIN and would, therefore, be thwarted from using the wireless terminal to place a call.

Although this technique is effective, it has three main disadvantages. First, the technique often works only for calls initiated within the authorized user's home wireless service area. Therefore, a thief can still succeed in stealing wireless service by taking the wireless terminal out of the authorized user's home wireless service area, or, alternatively, by stealing a wireless terminal from a user who is traveling outside the user's home area. Second, most users are annoyed at having to enter their PIN each time they initiate a call. And third, the transmission of the authentication request, the transmission of the PIN and the subsequent delay while the PIN is being confirmed by the wireless service provider all consume air time, which is inevitably paid for by the user, and delays the user in reaching their desired party.

Alternatively, a wireless telecommunications system could reduce the annoyance to a user by requiring the PIN to be transmitted only after power-up but before the first call is placed. However, this technique compromises security for safety, since the wireless terminal can be stolen before it is powered off.

Some wireless terminals have a provision that prevents a call from being initiated unless the user enters a key sequence that matches a PIN stored in the terminal before each call is initiated. This technique is, advantageous because it works outside of the wireless terminal's home area and because there is no air time consumption. The technique is annoying, however, because a user must still enter a candidate PIN before each call is initiated.

Therefore, the need exists for a more advantageous technique that prevents the thief of a wireless terminal from stealing wireless service.

SUMMARY OF THE INVENTION

Some embodiments of the present invention are capable of preventing the thief of a wireless terminal from using the wireless terminal to steal wireless service without many of the costs and restrictions associated with techniques in the prior art. In particular, a wireless terminal incorporating an embodiment of the present invention works outside the user's home wireless service area, consumes no air time in confirming the PIN and only requires the user to input a candidate PIN when making or receiving some calls. Furthermore, a wireless telecommunications system incorporating an embodiment of the present invention can be applied to all wireless terminals in its domain without requiring changes to the wireless terminals and only requires the user to input a candidate PIN when making or receiving some calls.

Embodiments of the present invention are premised on the observation that a thief and an authorized user of a wireless terminal are unlikely to desire to initiate calls to the same telephone numbers or to receive incoming calls from the same telephone number. Therefore, if either the wireless terminal or the wireless telecommunications system contained a list of the telephone numbers that have been dialed by the authorized user of the wireless terminal, and that have been preceded by the entry of a correct PIN, then the wireless terminal and the wireless telecommunications system could thereafter exempt from authentication calls to and from those telephone numbers without substantially compromising security.

One embodiment of the present invention involves having the wireless terminal track the telephone numbers that an authorized user calls and receives calls from and having the wireless terminal exempt calls placed to or received from those telephone numbers from the requirement that a PIN be entered before the call is established. Initially, when an user acquires a new wireless terminal and initiates a call to a telephone number that has never been called before, the wireless terminal will require that the PIN be entered. Thereafter, another call can be placed to that telephone without having the wireless terminal require the user to enter the PIN again. Eventually, as the wireless terminal accumulates a history of the calls placed by the authorized user, the frequency of verification requests decreases until, for many users a PIN verification request becomes a rare event.

Alternatively, some embodiments of the present invention can be implemented in the wireless telecommunications system, in contrast to being implemented in the wireless terminal.

The difference between an embodiment of the present invention and the prior art is apparent for an illustrative example in which an authorized user makes three successive calls to her sister. In the prior art, the wireless telecommunications system requires that the user input her candidate PIN three times, once for each time the user calls her sister. In accordance with some embodiments of the present invention, the wireless telecommunications system only requires that the user input her candidate PIN once, the first time she called her sister. Thereafter, the wireless telecommunications system would permit calls to the sister without requiring the PIN to be re-entered.

Although the illustrative embodiment would enable a thief to call the authorized user's sister, the premise of the invention is that the thief is unlikely to desire to call or to benefit from calling the sister. Therefore, although the thief is not totally prevented from stealing wireless service, the thief is prevented from using the wireless terminal in a manner that is likely to be useful to the thief, and, therefore, the thief is unlikely to use the wireless terminal at all.

BRIEF DESCRIPTION OF THE DRAWINGS

FIG. 5 depicts a portion of a flowchart that illustrates the operation of the wireless terminal in FIG. 1 or the operation of the wireless switching center in FIG. 10.

FIG. 6 depicts a portion of a flowchart that illustrates the operation of the wireless terminal in FIG. 1 or the operation of the wireless switching center in FIG. 10.

FIG. 7 depicts a portion of a flowchart that illustrates the operation of the wireless terminal in FIG. 1 or the operation of the wireless switching center in FIG. 10.

FIG. 8 depicts a portion of a flowchart that illustrates the operation of the wireless terminal in FIG. 1 or the operation of the wireless switching center in FIG. 10.

FIG. 9 depicts a portion of a flowchart that illustrates the operation of the wireless terminal in FIG. 1 or the operation of the wireless switching center in FIG. 10.

DETAILED DESCRIPTION

Figure 1:
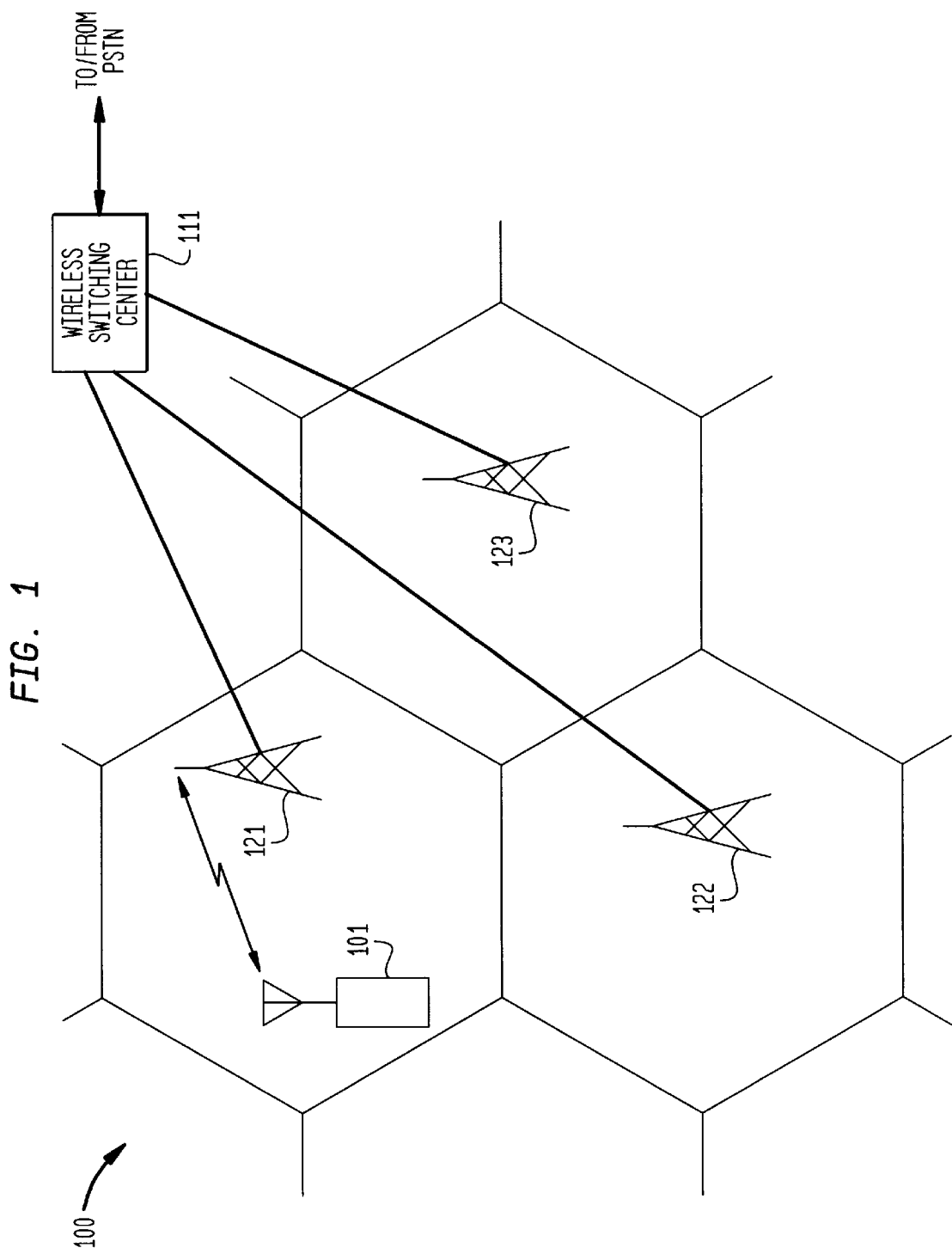
FIG. 1 depicts a block diagram of a wireless terminal and a wireless telecommunications system in accordance with the prior art.

FIG. 1 depicts a schematic diagram of wireless telecommunications system 100 and wireless terminal 101, in accordance with an illustrative embodiment of the present invention. Wireless telecommunications system 100 advantageously comprises the base stations and wireless switching center that constitute the infrastructure necessary to provide wireless telecommunications service to wireless terminal 101 and to provide access to and from the public switched telephone network.

It will be clear to those skilled in the art that the means for embodying the present invention can be distributed between wireless telecommunications system 100 and wireless terminal 101 so that the means reside: (1) solely in wireless telecommunications system 100, (2) solely in wireless terminal 101, or (3) partially in wireless telecommunications system 100 and partially in wireless terminal 101. For pedagogical reasons, the illustrative embodiment teaches the means embodying the illustrative embodiment residing solely in wireless terminal 101. It will be clear to those skilled in the art that some or all of these means may, in other embodiments, reside in wireless telecommunications system 100.

Figure 2:
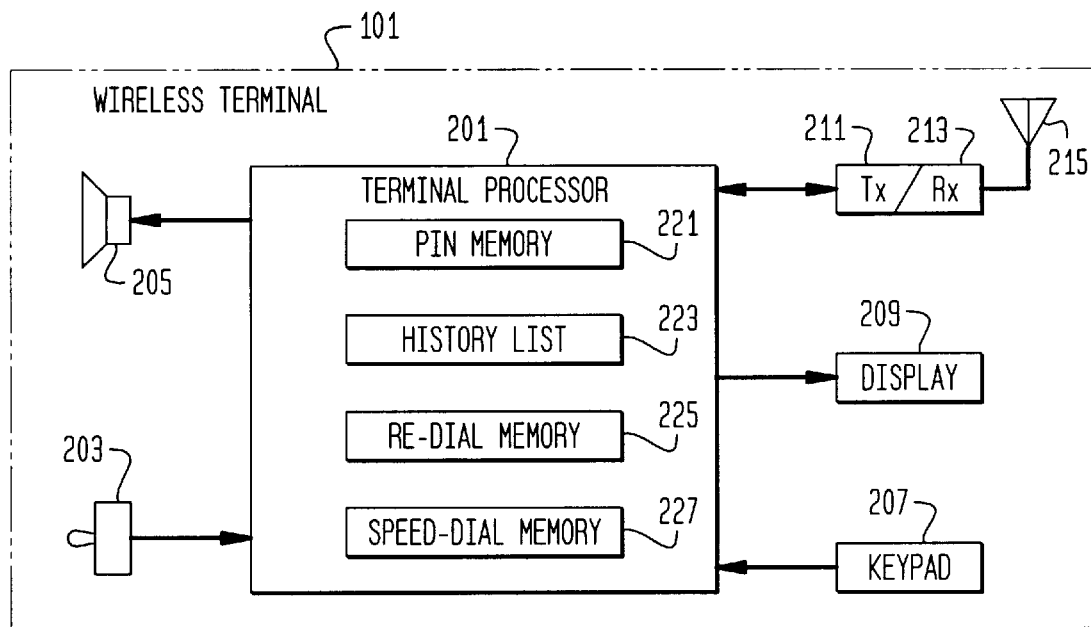
FIG. 2 depicts a block diagram of the salient components of a wireless terminal in accordance with an illustrative embodiment of the present invention.

FIG. 2 depicts a block diagram of the salient components of a wireless terminal (e.g., a cellular telephone, a cordless telephone, a notebook computer with wireless modem, etc.) in accordance with an illustrative embodiment of the present invention. Wireless terminal 101 advantageously comprises: terminal processor 201 with PIN memory 221, history list 223, re-dial memory 225 and speed-dial memory 227, microphone 203, speaker 205, keypad 207, display 209, wireless transmitter 211, wireless receiver 213 and antenna 215, all interconnected as shown.

Wireless terminal 101 is advantageously compliant with one or more air interface standards, such as AMPS, IS-54 TDMA, IS-95 CDMA, NAMPS, DECT, JDC and GSM, etc., and is capable of providing two-way voice or data communications, or both, with a remote wireless telecommunications system. Microphone 203, speaker 205, keypad 207, display 209, wireless transmitter 211, wireless receiver 213 and antenna 215 are a well-known in the art and will not be discussed further.

Terminal processor 201 is advantageously a general purpose digital processor with non-volatile memory, RAM, ROM, I/O and analog-to-digital converters that is programmed to function as a wireless terminal and to perform the steps depicted in the flowcharts in FIGS. 4,5, 6,7,8 and 9. It will be clear to those skilled in the art how to make and use wireless terminal 101.

Figure 3:
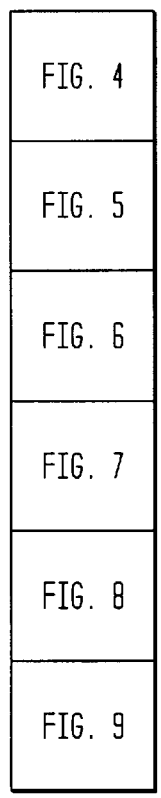
FIG. 3 depicts a schematic diagram that shows the interrelationship of the flowchart portions depicted in FIGS. 4, 5, 6, 7, 8 and 9.

FIG. 3 depicts how the flowchart portions shown in FIGS. 4, 5, 6, 7, 8 and 9 are interrelated.

Figure 4:
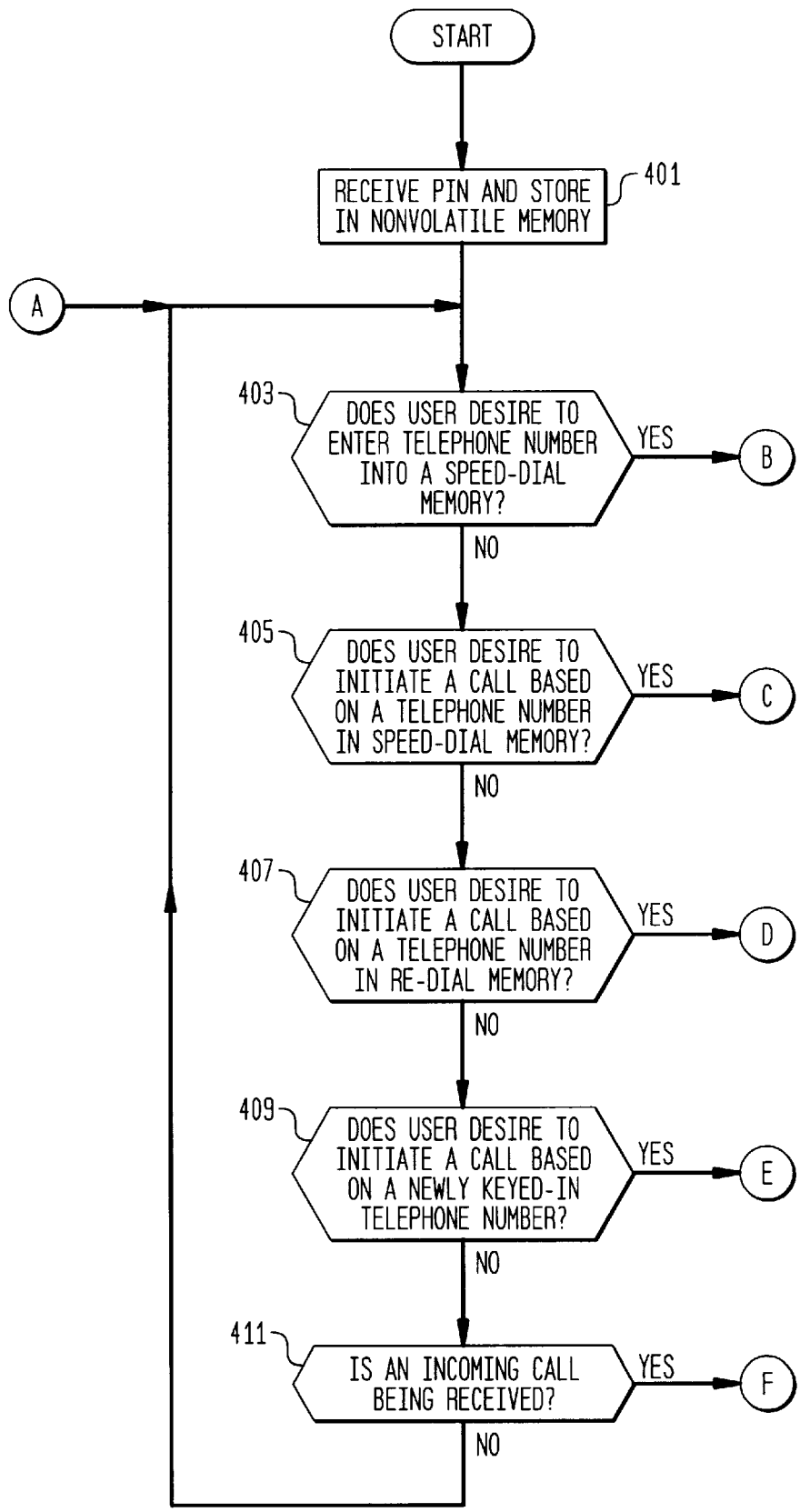
FIG. 4 depicts a portion of a flowchart that illustrates the operation of the wireless terminal in FIG. 1 or the operation of the wireless switching center in FIG. 10.

FIG. 4 depicts the flowchart fragment at which the illustrative embodiment of the present invention begins. In accordance with the illustrative embodiment, a user can initiate a call based on a telephone number in speed-dial memory 227 or re-dial memory 225 without having to enter the PIN, but the user must enter the PIN to program a telephone number into speed-dial memory 227. Similarly, a user must enter the PIN to initiate a call based on a keyed-in telephone number, but once the PIN is accepted, the embodiment allows the user to initiate, for perhaps a limited time, subsequent calls to that number without having to re-enter the PIN. Furthermore, the user can establish an incoming call from a telephone number that is in speed-dial memory 227 or re-dial memory 225 or history list 223 without having to enter the PIN.

At step 401, wireless terminal 101 advantageously receives a personal identification number ("PIN") from a user through keypad 207, when wireless terminal is first acquired and put into service by the user. The PIN is advantageously a number that is easily remembered by the user but that is selected from a large enough set of numbers so that it cannot easily be guessed someone else. Typically, a PIN is a four-digit decimal number that is selected from 10,000 possible numbers.

At step 401, terminal processor 201 advantageously stores the received PIN in non-volatile PIN memory 221. Table 1 depicts PIN memory 221.

TABLE 1

PIN Memory

| PIN Memory |
|---|
| 1234 |

Periodically or sporadically, the user can advantageously change the PIN in non-volatile memory 221, but only with the knowledge of the PIN itself. Otherwise, a thief could circumvent the outlined precautions by programming the wireless terminal with a PIN of the thief's own choosing. To enable the PIN in wireless terminal 101 to be initially programmed, wireless terminal advantageously arrives from the factory with a known, default PIN. It will be clear to those skilled in the art how to make and use wireless terminal 101 so that it receives a PIN and stores it in non-volatile memory 221.

At step 403, terminal processor 201 determines if the user desires to enter a telephone number into speed-dial memory 227. Speed-dial memory is a non-volatile memory that contains an ordered list of n telephone numbers, any of which can be dialed by entering the index entry (also called the "location") of the telephone number into wireless terminal 101. Table 2 depicts speed-dial memory 227.

TABLE 2

Speed Dial Memory 227

| Index Entry | Telephone Number |
|---|---|
| 0 | 703-555-1212 |
| 1 | 908-582-3354 |
| 2 | 765-342-3345 |
| ... | ... |
| ... | ... |
| ... | ... |
| n | 412-333-4567 |

When terminal processor 201 determines that the user desires to enter a telephone number into speed-dial memory 227, control passes to step 501 in FIG. 5.

At step 405, terminal processor 201 determines if the user desires to initiate a call based on a telephone number in speed-dial memory 227, and when the user does, control passes to step 601 in FIG. 6.

At step 407, terminal processor 201 determines if the user desires to initiate a call based on the telephone number in re-dial memory 225. Re-dial memory 225 is a memory in terminal processor 207 that stores the most recently called telephone number. Table 3 depicts re-dial memory 227.

TABLE 3

Re-Dial Memory 225

| Re-Dial Memory |
|---|
| 908-264-5100 |

When terminal processor 201 determines that the user desires to initiate a call based on the telephone number in re-dial memory 225, control passes to step 701 in FIG. 7.

At step 409, terminal processor 201 determines if the user desires to initiate a call based on a newly keyed-in telephone number, and when the user does, control passes to step 801 in FIG. 8.

At step 411, terminal processor 201 determines if an incoming call is being received, and when it is, control passes to step 901 in FIG. 9. It will be clear to those skilled in the art that steps 403, 405, 407, 409 and 411 can be performed in any order, or in parallel, and that the order shown in FIG. 3 is illustrative only.

At step 501 in FIG. 5, wireless terminal 101 begins the process of storing a telephone number into speed-dial memory 227. At step 501 terminal processor 201 advantageously receives (1) a telephone number, (2) a speed-dial memory location, and (3) a candidate PIN through keypad 207. The candidate PIN is requested because terminal processor 201 will not enter the telephone number into speed-dial memory 227 unless the candidate PIN matches the PIN in PIN memory 221.

At step 503, terminal processor 201 compares the candidate PIN to the PIN in PIN memory 221. If they match, which indicates that the user currently using wireless terminal 101 is authorized to use the terminal, then control passes to step 505. If there is no match, then control passes to step 507.

At step 505, terminal processor 201 stores the received telephone number into the desired speed-dial memory location and then control passes to step 403 in FIG. 4. At step 507, terminal processor 201 notifies the user, through display 209, that the candidate PIN is not accepted and that the telephone number has not been stored in speed-dial memory 227. Control then passes to step 403 in FIG. 4.

At step 601 in FIG. 6, wireless terminal 101 begins the process of initiating a call based on a telephone number that is stored in speed-dial memory 227. At step 601, terminal processor 201 advantageously receives a speed-dial memory location from the user through keypad 207.

At step 603, terminal processor 201 retrieves the telephone number from speed-dial memory 227 that is associated with the received speed-dial memory location. Because the telephone number comes from speed-dial memory 227, and because the telephone number could only have been entered into speed-dial memory 227 with a valid candidate PIN, terminal processor 201 "perfects" the telephone number.

For the purposes of this specification, terminal processor 201 "perfects" a telephone number when terminal processor 201 has a record that a valid candidate PIN has been entered—either recently or in the past—into the wireless terminal in conjunction with that telephone number.

At step 605, terminal processor 201 initiates a call based on the retrieved telephone number.

At step 607, terminal processor 201 stores the retrieved telephone number into re-dial memory 225 and control passes to step 203.

At step 701 in FIG. 7, wireless terminal 101 begins the process of initiating a call based on a telephone number stored in re-dial memory 225. At step 701, terminal processor 201 receives a command from the user through keypad 207 to retrieve the telephone number in re-dial memory 225 and to initiate a call based on that telephone number. Because the telephone number is retrieved from re-dial memory 225, terminal processor 201 perfects the telephone number.

At step 703, terminal processor 201 initiates a call based on the retrieved telephone number because the telephone number has been perfected. After step 703, control passes to step 403 in FIG. 4.

At step 801 in FIG. 8, wireless terminal 101 begins the process of initiating a call based on a key-in telephone number. At step 801, terminal processor 201 receives the telephone number from the user through keypad 207.

At step 803, terminal processor 201 determines if the telephone number is in either: (1) speed-dial memory 227, (2) re-dial memory 225, or history list 223. History list 223 is advantageously a non-volatile memory in terminal processor 201 that stores a list of previously perfected telephone numbers. If a telephone number is in either (1) speed-dial memory 227, (2) re-dial memory 225, or (3) history list 223, then at step 813 the telephone number is perfected and at step 815 terminal processor 201 initiates a call based on the telephone number.

It should be understood that in accordance with the illustrative embodiment a telephone number is perfected in one of four ways: (1) is it in speed-dial memory 227, (2) it is in re-dial memory 225, (3) it is in history list 223, or (4) it has just been entered along with a valid PIN. It should also be understood that in accordance with the illustrative embodiment, a telephone number must be perfected before terminal processor 201 will initiate a call based on it.

If the telephone number is not in either: (1) in speed-dial memory 227, (2) in re-dial memory 225, or (3) in history list 223, then at step 805 that telephone number is not perfected. When a telephone number is not perfected, it means that the terminal processor 201 requires that a candidate PIN be entered and that the candidate PIN match the PIN in PIN memory 221 before terminal processor 201 will initiate a call based on that telephone number.

At step 807, terminal processor 201 prompts the user through display 209 to enter a candidate PIN through keypad 207. At step 809, terminal processor 201 determines if the candidate PIN matches the PIN in PIN memory 221. If there is no match, then at step 811, terminal processor 201 notifies the user through display 209 that the candidate PIN is not accepted and that a call will not be initiated based on the keyed-in telephone number. Control then passes to step 403 in FIG. 4.

When at step 809 the candidate PIN matches the PIN in PIN memory 221, control passes to step 813 and the telephone number is perfected. At step 815, terminal processor 201 initiates a call based on the telephone number and at step 817 terminal processor 201 stores the telephone number into re-dial memory 225.

At step 819, terminal processor 201 adds the keyed-in telephone number to history list 223. In a typical embodiment each added telephone number is inserted at the top of the list, which pushes all previously stored numbers down one place. When the memory allocated for history list 223 is full, the oldest number in the list is deleted when a new number is added. Table 4 is an example of history list 223. It is apparent that history list 223 as shown in Table 4 can contain repetitions of the same number.

TABLE 4

One Embodiment of History List 223

Telephone Number 345-555-1212
732-453-9939
449-332-7756
. . .
. . .
345-555-1212
834-339-9923

In another embodiment of history list 223, history list 223 is searched for the presence of a telephone number prior to the insertion of that telephone number at the top of the list; when the telephone number is found within history list 223, the found entry is deleted and each entry above that location will be pushed down one position. This embodiment shall be called "a no-repetition history list," because it cannot contain duplicate entries. Table 5 illustrates a no-repetition history list before adding the number 345-555-1212 .

TABLE 5

A no-repetition history list before adding
the telephone number 345-555-1212

Telephone Number 434-546-4532
732-453-9939
345-555-1212
. . .
. . .
449-332-7756
834-339-9923

Table 6 depicts Table 5 after the telephone number 345-555-1212 has been added.

TABLE 6

A no-repetition history list after
adding the telephone number 345-555-1212

Telephone Number 345-555-1212
434-546-4532
732-453-9939
. . .
. . .
449-332-7756
834-339-9923

In yet another embodiment of history list 223, each list entry comprises a telephone number and a count of the number of times that number has been dialed. Typically, the list is organized in decreasing order of the counts. Adding a telephone number to this list is done in the same way described for the no-repetition history list above, except that if the new telephone number is found in an existing list entry, the count in that entry is increased by one; if the telephone number is not found in the history list, the telephone number with the fewest counts is deleted and a new entry is made for the new telephone number with a count of one. After each time a number is added the list is sorted again in a decreasing order of counts. This type of history list shall be called a "countable history list."

In some embodiments of the present invention, wrongly dialed numbers are prevented from entering history list 223 by requiring that a telephone number is added to history list 223 only if the called telephone number is answered and the call lasts for a minimum duration (e.g., 10 seconds).

Table 7 and Table 8 depict, respectively, an example of a countable history list before and after adding the number 345-555-1212 which is already in the list, Table 9 shows the same table after the number 908-421-4422 is added to it and the table is sorted again.

TABLE 7

A countable history list before adding the number 345-555-1212

| #4 | 449-332-7756 |
|---|---|
| #3 | 345-555-1212 |
| #2 | 732-453-9939 |

TABLE 8

A countable history list after adding the number 345-555-1212

| | |
|---|---|
| #4 | 345-555-1212 |
| #4 | 449-332-7756 |
| #2 | 732-453-9939 |

TABLE 9

A countable history list after adding the number 908-421-4422

| | |
|---|---|
| #4 | 345-555-1212 |
| #3 | 449-332-7756 |
| #1 | 908-421-4422 |

In yet another embodiment of the system, which uses a countable history list, a telephone number is perfected only if that telephone number is present in history list 223 and has a count that is not smaller than some threshold. For example, if the threshold is 2, a number will be perfected only if it was dialed before the threshold number of times with PIN verification. In the example of Table 9 only the first two entries will be perfected if dialed—the third entry will not be perfected since its count is less than the threshold, which is 2.

In yet another embodiment, telephone numbers of incoming calls are added to history list 223 in the same manner as outgoing manually-dialed numbers, which expedites the filling of history list 223.

It will be clear to those skilled in the art that there are numerous heuristics that can be used to update history list 223. After step 819, control passes to step 403 in FIG. 4.

At step 901 in FIG. 9, the illustrative embodiment begins the process of establishing (or "answering") an incoming call. At step 901 terminal processor 201 determines if the telephone number from which the incoming call originates is in history list 223, re-dial memory 225 or speed-dial memory 227. If it is, then control passes to step 911; otherwise control passes to step 903.

At step 903, terminal processor 201 notifies the user through display 209 that the telephone number from which the incoming call originates is not perfected, and at step 905 terminal processor 201 prompts the user to enter a candidate PIN.

At step 907, terminal processor 201 determines if the candidate PIN matches the PIN stored in PIN memory 221. When there is a match, control passes to step 911; otherwise control passes to step 909.

At step 909, terminal processor 201 notifies the user via display 209 that the candidate PIN is not accepted and terminal processor 201 prevents the incoming call from being established. Control then passes to step 403 in FIG. 4.

At step 911, terminal processor 201 perfects the telephone number, and at step 913 terminal processor 201 establishes the incoming call. At step 915, terminal processor 201 updates history list 223 with the telephone number from which the incoming call is associated. Control then passes to step 403 in FIG. 4.

It will be clear to those skilled in the art how to make and use wireless terminal 101 in accordance with the illustrative embodiment of the present invention.

Figure 10:
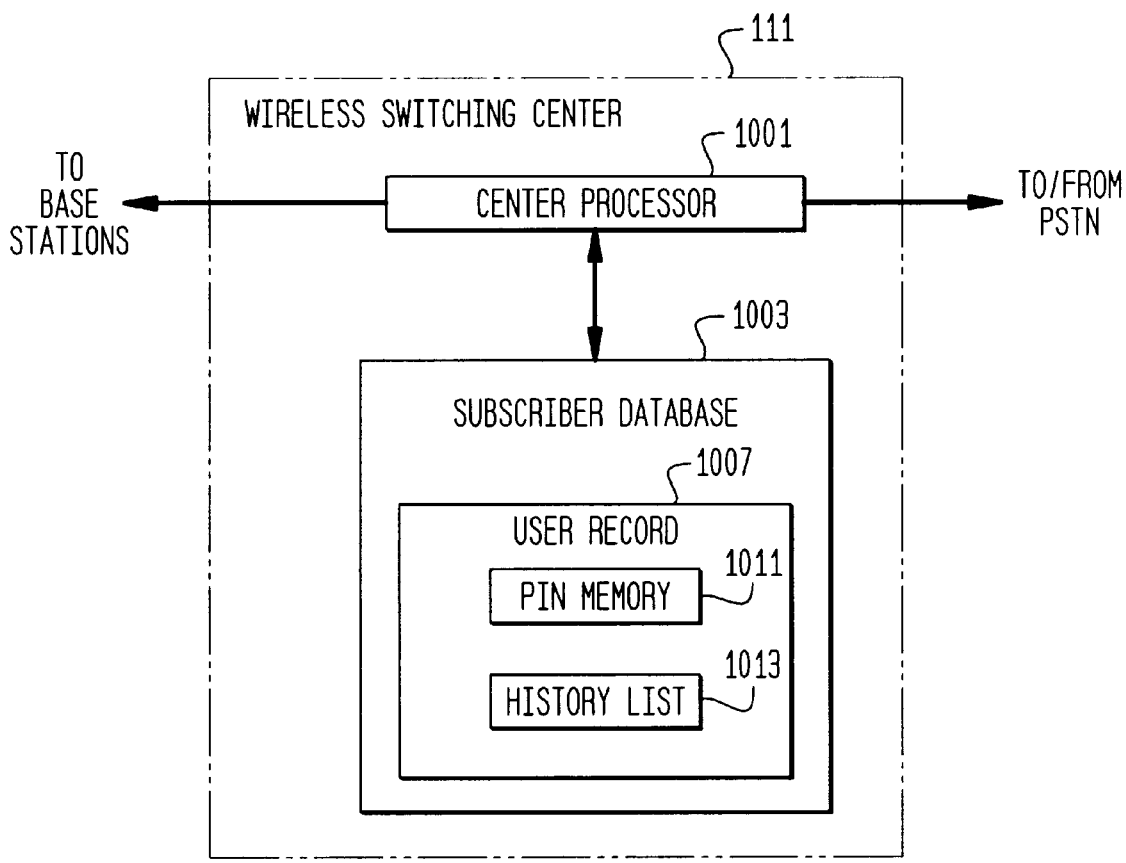
FIG. 10 depicts a block diagram of the salient components of the wireless switching center of FIG. 1 in accordance with the illustrative embodiment of the present invention.

Alternatively, embodiments of the present invention can reside in wireless telecommunications system 100 rather than in wireless terminal 101. FIG. 10 depicts a block diagram of wireless switching center 111 in wireless telecommunications system 100. Wireless switching center 111 advantageously comprises center processor 1001 and subscriber database 1003, which comprises a user record for each subscriber authorized to use the system. A user record, such as user record 1007 advantageously comprises: PIN memory 1011 and history list 1013. One advantage of incorporating an embodiment of the present invention into wireless telecommunications system 100 is that the embodiment can be applied universally to all wireless terminals without having to retrofit or supplant the existing wireless terminals.

Center processor 1001 is advantageously a general purpose digital processor and subscriber database 1007 is advantageously a non-volatile memory available to center processor 1001. Because calls to and from wireless terminal 101 must be established through center processor 1001, center processor 1001 can mimic terminal processor 201 in performing the salient steps depicted in the flowcharts in FIGS. 4, 5, 6, 7 and 8, with appropriate modifications because center processor 1001 and subscriber database 1003 resides on a different side of the air-interface than does terminal processor 201. It will be clear to those skilled in the art how to make and use wireless switching center 111.

It is to be understood that the above-described embodiments are merely illustrative of the invention and that many variations can be devised by those skilled in the art without departing from the scope of the invention. It is therefore intended that such variations be included within the scope of the following claims.

What is claimed is:

1. A method comprising the steps of:
    receiving a personal identification number;
    storing said personal identification number into a memory;
    receiving a request from a user to initiate a wireless call based on a telephone number;
    initiating a wireless call when said telephone number has been perfected;
    receiving a candidate personal identification number when said telephone number has not been perfected; and
    perfecting said telephone number when said candidate personal identification number matches said personal identification number.

2. The method of claim 1 further comprising the step of perfecting said telephone number when said telephone number is in a history list.

3. The method of claim 1 further comprising the step of updating a history list with said telephone number when said telephone number has been perfected.

4. The method of claim 1 further comprising the step of perfecting said telephone number when said telephone number is in a speed dial memory.

5. The method of claim 1 further comprising the steps of:
    receiving an incoming call that is associated with an incoming telephone number;
    establishing said incoming call when said incoming telephone number has been perfected; and
    forbearing from said establishing said incoming call when said incoming telephone number has been discredited.

6. The method of claim 5 further comprising the steps of:
    receiving a candidate personal identification number when said incoming telephone number has not been perfected; and
    perfecting said incoming telephone number when said candidate personal identification number matches said personal identification number.

7. The method of claim 6 further comprising the step of updating said history list with said incoming telephone number when said incoming telephone number has been perfected.

8. A method comprising the steps of:
receiving a personal identification number;
storing said personal identification number into a memory;
receiving an incoming call that is associated with an incoming telephone number;
establishing said incoming call when said incoming telephone number has been perfected;
receiving a candidate personal identification number when said incoming telephone number has not been perfected; and
perfecting said incoming telephone number when said candidate personal identification number matches said personal identification number.

9. The method of claim 8 further comprising the step of perfecting said telephone number when said telephone number is in a history list.

10. The method of claim 8 further comprising the step of updating a history list with said telephone number when said telephone number has been perfected.

11. The method of claim 8 further comprising the step of perfecting said telephone number when said telephone number is in a speed dial memory.

12. The method of claim 8 further comprising the steps of:
receiving a request from a user to initiate a wireless call based on an outgoing telephone number; and
initiating said wireless call based on said outgoing telephone number when said outgoing telephone number has been perfected.

13. The method of claim 12 further comprising the steps of:
receiving a candidate personal identification number when said outgoing telephone number has not been perfected; and
perfecting said outgoing telephone number when said candidate personal identification number matches said personal identification number.

14. The method of claim 13 further comprising the step of updating a history list with said outgoing telephone number when said outgoing telephone number has been perfected.

15. A wireless terminal comprising:
means for receiving a personal identification number;
means for storing said personal identification number into a memory;
means for receiving a request from a user to initiate a wireless call based on a telephone number;
means for initiating a wireless call when said telephone number has been perfected;
means for receiving a candidate personal identification number when said telephone number has not been perfected; and
means for perfecting said telephone number when said candidate personal identification number matches said personal identification number.

16. The wireless terminal of claim 15 further comprising means for perfecting said telephone number when said telephone number is in a history list.

17. The wireless terminal of claim 15 further comprising means for updating a history list with said telephone number when said telephone number has been perfected.

18. The wireless terminal of claim 15 further comprising means for perfecting said telephone number when said telephone number is in a speed dial memory.

19. The wireless terminal of claim 15 further comprising the steps of:
means for receiving an incoming call that is associated with an incoming telephone number;
means for establishing said incoming call when said incoming telephone number has been perfected; and
means for forbearing from said establishing said incoming call when said incoming telephone number has been discredited.

20. The wireless terminal of claim 19 further comprising the steps of:
means for receiving a candidate personal identification number when said incoming telephone number has not been perfected; and
means for perfecting said incoming telephone number when said candidate personal identification number matches said personal identification number.

21. The wireless terminal of claim 20 further comprising means for updating said history list with said incoming telephone number when said incoming telephone number has been perfected.

22. A wireless terminal comprising:
means for receiving a personal identification number;
means for storing said personal identification number into a memory;
means for receiving an incoming call that is associated with an incoming telephone number;
means for establishing said incoming call when said incoming telephone number has been perfected;
means for receiving a candidate personal identification number when said incoming telephone number has not been perfected; and
means for perfecting said incoming telephone number when said candidate personal identification number matches said personal identification number.

23. The wireless terminal of claim 22 further comprising means for perfecting said telephone number when said telephone number is in a history list.

24. The wireless terminal of claim 22 further comprising means for updating a history list with said telephone number when said telephone number has been perfected.

25. The wireless terminal of claim 22 further comprising means for perfecting said telephone number when said telephone number is in a speed dial memory.

26. The wireless terminal of claim 22 further comprising the steps of:
means for receiving a request from a user to initiate a wireless call based on an outgoing telephone number; and
means for initiating said wireless call based on said outgoing telephone number when said outgoing telephone number has been perfected.

27. The wireless terminal of claim 26 further comprising the steps of:
means for receiving a candidate personal identification number when said outgoing telephone number has not been perfected; and
perfecting said outgoing telephone number when said candidate personal identification number matches said personal identification number.

28. The wireless terminal of claim 27 further comprising the step of updating a history list with said outgoing telephone number when said outgoing telephone number has been perfected.

29. A wireless telecommunication system comprising:

means for receiving a personal identification number;

means for storing said personal identification number into a memory;

means for receiving a request from a user to initiate a wireless call based on a telephone number;

means for initiating a wireless call when said telephone number has been perfected;

means for receiving a candidate personal identification number when said telephone number has not been perfected; and means for perfecting said telephone number when said candidate personal identification number matches said personal identification number.

30. The wireless telecommunication system of claim 29 further comprising means for perfecting said telephone number when said telephone number is in a history list.

31. The wireless telecommunication system of claim 29 further comprising means for updating a history list with said telephone number when said telephone number has been perfected.

32. The wireless telecommunication system of claim 29 further comprising means for perfecting said telephone number when said telephone number is in a speed dial memory.

33. The wireless telecommunication system of claim 29 further comprising the steps of:

means for receiving an incoming call that is associated with an incoming telephone number;

means for establishing said incoming call when said incoming telephone number has been perfected; and means for forbearing from said establishing said incoming call when said incoming telephone number has been discredited.

34. The wireless telecommunication system of claim 33 further comprising the steps of:

means for receiving a candidate personal identification number when said incoming telephone number has not been perfected; and means for perfecting said incoming telephone number when said candidate personal identification number matches said personal identification number.

35. The wireless telecommunication system of claim 34 further comprising means for updating said history list with said incoming telephone number when said incoming telephone number has been perfected.

36. A wireless telecommunication system comprising:

means for receiving a personal identification number;

means for storing said personal identification number into a memory;

means for receiving an incoming call that is associated with an incoming telephone number;

means for establishing said incoming call when said incoming telephone number has been perfected;

means for receiving a candidate personal identification number when said incoming telephone number has not been perfected; and means for perfecting said incoming telephone number when said candidate personal identification number matches said personal identification number.

37. The wireless telecommunication system of claim 36 further comprising means for perfecting said telephone number when said telephone number is in a history list.

38. The wireless telecommunication system of claim 36 further comprising means for updating a history list with said telephone number when said telephone number has been perfected.

39. The wireless telecommunication system of claim 36 further comprising means for perfecting said telephone number when said telephone number is in a speed dial memory.

40. The wireless telecommunication system of claim 36 further comprising the steps of:

means for receiving a request from a user to initiate a wireless call based on an outgoing telephone number; and means for initiating said wireless call based on said outgoing telephone number when said outgoing telephone number has been perfected.

41. The wireless telecommunication system of claim 40 further comprising the steps of:

means for receiving a candidate personal identification number when said outgoing telephone number has not been perfected; and perfecting said outgoing telephone number when said candidate personal identification number matches said personal identification number.

42. The wireless telecommunication system of claim 41 further comprising the step of updating a history list with said outgoing telephone number when said outgoing telephone number has been perfected.

* * * * *